United States Patent [19]

Fujii et al.

[11] Patent Number: 5,908,876
[45] Date of Patent: Jun. 1, 1999

[54] OPTICAL RESIN COMPOSITION COMPRISING A THIOURETHANE PREPOLYMER AND USE THEREOF

[75] Inventors: Kenichi Fujii; Nobuya Kawauchi; Toshiyuki Suzuki; Seiichi Kobayashi; Masao Imai, all of Kanagawa-ken, Japan

[73] Assignee: Mitsui Chemicals, Inc., Tokyo, Japan

[21] Appl. No.: 08/831,534

[22] Filed: Apr. 7, 1997

[51] Int. Cl.⁶ .............................. C08L 75/04; C08L 81/04; C08F 2/50
[52] U.S. Cl. .................. 522/142; 522/180; 522/173; 522/182; 522/60; 522/364; 522/363; 522/376; 351/159; 359/642
[58] Field of Search ...................... 522/142, 182, 522/180, 173; 528/306, 376, 60, 364, 363

[56] References Cited

U.S. PATENT DOCUMENTS

| | | | |
|---|---|---|---|
| 4,689,387 | 8/1987 | Kajimoto et al. | 528/76 |
| 4,775,733 | 10/1988 | Kanemura et al. | 528/67 |
| 4,931,521 | 6/1990 | Matsuda et al. | 526/286 |
| 5,247,041 | 9/1993 | Iguchi et al. | 526/289 |
| 5,270,439 | 12/1993 | Maruyama et al. | 528/272 |
| 5,442,022 | 8/1995 | Keita et al. | 522/180 |
| 5,488,128 | 1/1996 | Bader et al. | 558/251 |
| 5,578,658 | 11/1996 | Sasagawa et al. | 528/60 |
| 5,679,756 | 10/1997 | Zhu et al. | 528/65 |
| 5,736,609 | 4/1998 | Irizato et al. | 522/135 |

FOREIGN PATENT DOCUMENTS

| | | |
|---|---|---|
| 378895 | 7/1990 | European Pat. Off. . |
| 659790 | 6/1995 | European Pat. Off. . |
| 665219 | 8/1995 | European Pat. Off. . |
| 4017940 | 6/1990 | Germany . |
| 63-29692 | 6/1988 | Japan . |
| 63-199210 | 8/1988 | Japan . |
| 63-207805 | 8/1988 | Japan . |
| 2-270859 | 11/1990 | Japan . |
| 5-25240 | 2/1993 | Japan . |
| 7-228659 | 8/1995 | Japan . |
| 7-252207 | 10/1995 | Japan . |

OTHER PUBLICATIONS

Patent Abstracts of Japan, vol. 006, No. 165 (C–121), Aug. 28, 1982 & JP 57 080428 (Sumitomo Bakelite Co. Ltd.) May 20, 1982 *Abstract*.

Patent Abstracts of Japan, vol. 018, No. 615 (C–1277), Nov. 24, 1994 & JP 06234829 (Mitsui Toatsu Chem. Inc.), Aug. 23, 1994 *Abstract*.

Patent Abstracts of Japan, vol. 095, No. 001, Feb. 28, 1995 & JP 06294901 (Mitsubishi Ryon Co., Ltd.), Oct 21., 1994 *Abstract*.

Patent Abstracts of Japan, vol. 018, No. 222 (C–1193), Apr. 21, 1994 & JP 06 016729 (Toray Ind. Inc.), Jan. 25, 1994 *Abstract*.

*Primary Examiner*—Susan W. Berman
*Attorney, Agent, or Firm*—Burns, Doane, Swecker & Mathis, L.L.P.

[57] ABSTRACT

Disclosed are: (1) an optical resin composition comprising Component A: a thiourethane prepolymer compound prepared by reacting a polythiol compound having at least 3 functional groups and an intramolecular sulfide bond, with a polyisocyanate compound in a molar ratio of —SH to —NCO ranging from 3.0 to 7.0 Component B: at least one (meth)acrylate compound having at least 2 functional groups; and Component C: a compound radically polymerizable with Components A and B, in 10 to 50% by weight, 35 to 70% by weight, and 5 to 30% by weight, respectively; (2) a preparation process for an optical resin by photopolymerization; (3) an optical resin; and (4) a prepolymer suitable for Component A. The composition is a novel, rapidly polymerizable composition for an optical resin. Furthermore, a resin prepared by curing the composition not only has a high refractive index and a high Abbe number, but also is excellent in transparency and optical homogeneity.

15 Claims, No Drawings

OPTICAL RESIN COMPOSITION COMPRISING A THIOURETHANE PREPOLYMER AND USE THEREOF

BACKGROUND OF THE INVENTION

1. Field of the Invention

This invention relates to an optical resin composition which can provide a resin with a high refractive index that is well-balanced in transparency, optical distortion, thermal resistance, tintability, impact resistance, and the like; an optical resin formed by polymerization and curing thereof; and an optical lens.

2. Description of the Related Art

Now, thermosetting optical resins and their monomers which are put to practical use for a lens for eyeglasses and the like can be substantially classified into two types; a polycondensation type represented by a thiourethane resin and a radical polymerization type represented by an acrylic or vinyl compound.

A thiourethane resin has advantages such as a high refractive index and an excellent impact resistance, which has come into wide use as a resin for an optical use, mainly for an eyeglass lens. Since the resin is prepared by forming an urethane bond by means of a condensation reaction of a thiol with an isocyanate, it, however, takes a long time, e.g., more than 24 hours, to conduct polymerization while maintaining optical homogeneity. Therefore, a sulfur-containing urethane resin has excellent characteristics as a resin, but seems to remain to be improved in terms of productivity.

On the other hand, a (meth)acrylate resin is excellent in productivity, because monomers can be rapidly polymerized via a radical reaction. In terms of its physical properties as a resin, it, however, has a deadly disadvantage, i.e., low impact resistance, and also its refractive index cannot be significantly improved, except some of those prepared from a thioacrylate.

Likewise, a resin based on a polyene-polythiol reaction can be formed with a high productivity because monomers can be rapidly polymerized via a radical reaction, while it has disadvantages such as a high volume shrinkage percentage making a precise casting polymerization difficult. In addition, as for physical properties as a resin, it is generally brittle, which, of course, limits its applications. Furthermore, the refractive index of the resin can be improved by increasing a content of a thiol component in the monomer composition. However, as the content of the thiol component increases, a resin prepared by polymerization increasingly becomes rubbery and thus cannot be used for an optical product.

In brief, it can be said that there remain problems in productivity for a thiourethane resin having excellent physical properties and in physical properties for a radical polymerization type of resin with a high productivity. In order to reconcile the productivity (rapid polymerization) with physical properties, several procedures have been already reported for combining an urethane bond and a radical polymerization of a polyene, (meth)acrylate or thiol.

For example, Japanese Patent Publication No. 29692/1988 suggests a polymerizable composition comprising a prepolymer prepared from a polythiol compound and a polyisocyanate and a polyene compound, to resolve the problems of brittleness and the volume shrinkage percentage during polymerization for a resin made from only a polyene compound. It, however, discloses the composition for preparing a casting material mainly for electronic applications, but not for any optical use. Therefore, the composition cannot be used for an optical resin with a high refractive index required to be optically homogeneous. For example, among the isocyanates disclosed in the publication, tolylene diisocyanate gives a resin insufficient in light resistance; the other aromatic isocyanates give ones insufficient in Abbe number; hexamethylene diisocyanate gives one with a low refractive index; and when a mercapto carboxylate recommended as an optimal alternative in the publication is used as a thiol compound, it gives a resin with a low refractive index, which is inappropriate to achieve an optical resin with a high refractive index.

Furthermore the publication does not pay special attention to an equivalent ratio of SH to NCO groups, just indicating a range of 1.5 to 50. However, it is the equivalent ratio that is an important parameter determining properties of a prepolymer, and should be strictly controlled. Specifically, when the ratio is too low, a prepolymer obtained may be highly viscous and thus cannot be mixed with another polyene compound, whereas when it is too high, a resulting product may not be effective as a prepolymer. In addition, it describes that a ratio between excessive SH group and an unsaturated group is generally 1:1, whereas the ratio should be a value in which the unsaturated group is sufficiently excessive to avoid a resin that tends to be rubbery. Thus, when a prepolymerized thiol is used for preparing an optical resin, the ratio between excessive SH group and an unsaturated group should be fully appropriates. In summary, monomers and their ratio should be appropriately selected; otherwise it is not feasible to provide an optical resin with a high refractive index and a high Abbe number and having excellent hardness and impact resistance.

Japanese Patent Laid-Open No. 199210/1988 and Japanese Patent Laid-Open No. 207805/1988 disclose preparation of an optical resin by means of a radical polymerization of a polyene compound having an urethane bond with a polythiol compound. However, in a reaction of a polyene with a polythiol, increase of a proportion of the polythiol may generally make a resin obtained rubbery. Thus, in order to provide a resin having adequate strength by means of reacting a polyene compound containing urethane bond with a polythiol, it is inevitable that the proportion of the polythiol in the entire resin should be considerably low. Consequently a resin obtained may have a low sulfur content, and therefore a resin with a high refractive index, about 1.6, cannot be prepared.

Japanese Patent Laid-Open No. 25240/1993 discloses an optical resin composition with a high refractive index comprising a mixture of a polyisocyanate and a polythiol as well as a radical-polymerizable unsaturated compound. It, however, pays no attention to an importance of prepolymerization. It is evident from the fact that the resin obtained has a low impact resistance, 21 g to 31 g, according to a dropping-ball test. To achieve an adequate effect of prepolymerization, simple blending of a polyisocyanate and a polythiol is not sufficient but definite conditions for reacting SH with NCO groups should be selected.

The application specifies the ratio of SH to NCO groups to be 0.5 to 2. However, when a prepolymerization is fully conducted in such a ratio, a prepolymer obtained will be extremely viscous, and will not be subsequently mixed with a compound having an unsaturated polymerizable group. Therefore, the disclosed composition may be inevitably regarded as a simple mixture of an isocyanate, a thiol and a monomer having an unsaturated group. In such a case, the composition should be cured by simultaneously performing two different types of reactions, i.e., a radical reaction and an urethane condensation. Therefore, it is essential to strictly control the polymerization reaction to maintain a constant proportion of an urethane bond in a resin obtained by the polymerization. In other words, depending on polymerization conditions, SH group may be completely consumed by a radical addition before completion of a slow reaction forming an urethane bond. It is thus anticipated that the unreacted isocyanate consequently may remain in the resin obtained. Residual isocyanate group may cause significant problems such as health problems for a resin-edging worker and adverse effects on a post-processing of a lens, e.g., inconsistencies in coating or dyeing.

Furthermore, a little variation of polymerization conditions may cause varying a proportion among chemical bonds in the resin. In other words, if the polymerization conditions are not adequately controlled, it is anticipated that physical properties of the resin product may vary. In addition, since different reactions simultaneously proceed during the polymerization, attention should be adequately paid to optical strain and optical inhomogenity for the resin obtained by the polymerization. Moreover, a mold releasing agent may be needed because of an urethane condensation reaction during a casting polymerization.

Japanese Patent Laid-Open No. 228659/1995 discloses a polymerizable composition comprising a mixture of a polythiol and a polyisocyanate as well as a compound having both hydroxyl or mercapto group and an unsaturated group such as (meth)acrylic group. A polythiol having a high sulfur content as illustrated in the reference can be used to prepare a resin having a high refractive index. However, the reference does not unambiguously suggest a prepolymerization, which indicates that still the polymerization reaction should be strictly controlled. Furthermore, since the monomer having an unsaturated group has also thiol or hydroxyl groups, a resin obtained may have a high thermal resistance, but a reduced tintability.

SUMMARY OF THE INVENTION

Objectives of this invention are;

(1) to make it possible to prepare a resin by means of polymerization using heat and/or light with a high productivity in a short time (2) to prepare a resin with a high refractive index; excellent transparency, thermal resistance, tintability and impact resistances and with extremely little optical strain or inhomogenity;

(3) to readily produce a lens with a reduced amount of residual monomers in a constant quality;

that is, to provide an optical resin excellent in physical properties and productivity; an optical resin composition therefor; and a lens therefrom.

The inventors have intensively attempted to achieve the above objectives, and discovered that a resin formed by polymerizing and curing a composition comprising a component obtained from prepolymerization of a polythiol compound having a particular structure with a polyisocyanate compound, a component consisting of a (meth)acrylate compound having a particular structure and a component co-polymerizable with these components, can be suitably used as a resin with a high refractive index, and is suitable for an optical lens; and that the composition can be cured by heating in a short time or by photo-polymerization with ultraviolet rays.

This invention thus relates to an optical resin composition comprising the following components A, B and C in 10 to 50% by weight, 35 to 70% by weight, and 5 to 30% by weight, respectively:

Component A: a thiourethane prepolymer compound prepared by reacting a polythiol compound having at least 3 functional groups and an intramolecular sulfide bond, with a polyisocyanate compound in a molar ratio of —SH to —NCO ranging from 3.0 to 7.0;

Component B: at least one (meth)acrylate compound having at least 2 functional groups;

Component C: a compound radically polymerizable with Components A and B.

This invention also relates to an optical resin composition wherein the polythiol compound used for preparation of Component A is represented by the following formula (1) or (2):

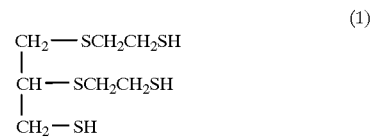

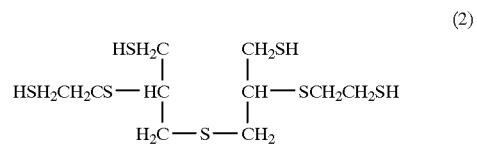

an optical resin composition wherein Component B comprises a compound represented by the following general formula (3):

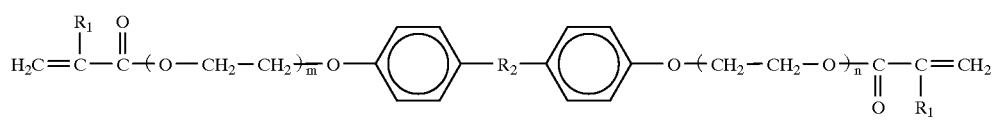

wherein $R_1$ represents hydrogen atom or methyl group; $R_2$ represents —$CH_2$—, —$C(CH_3)_2$— or —$SO_2$—; both m and n are an integer between 0 and 4; and m+n is 0 to 4;

an optical resin composition wherein Component C is selected from the group consisting of divinylbenzene, diisopropenylbenzene, styrene, ring-substituted styrenes, monofunctional (meth)acrylate compounds; and an optical resin and an optical lens with a high refractive index (nd) of at least 1.58, prepared by polymerizing and curing each of the above different compositions.

The composition of this invention is one which can be cured with heat or ultraviolet rays in a short time, and whose curing can provide an optical resin with a high refractive index and that is well-balanced in transparency, optical strain, thermal resistance, tintability, impact resistance and the like; and an optical lens having excellent properties.

DETAILED DESCRIPTION OF THE PREFERRED EMBODIMENTS

This invention will be detailed below.

A composition for an optical resin comprises;

10 to 50% by weight of Composite A, i.e., a thiourethane prepolymer compound prepared by reacting a polythiol compound having at least 3 functional groups and an intramolecular sulfide bond, with a polyisocyanate compound in a molar ratio of —SH to —NCO ranging from 30 to 7.0;

35 to 70% by weight of Component B. i.e., at least one (meth)acrylate compound having at least 2 functional groups; and 5 to 30% by weight of Component C, i.e., a compound radically polymerizable with Components A and B.

The polythiol compound used in preparation of Component A preferably has a high refractive index and a low viscosity because it is used as a thiourethane prepolymer compound, and also is preferably a polythiol having at least 3 functional groups to ensure thermal resistance in a resin obtained. For this purpose, a suitable polythiol may be selected from polythiol compounds having 3 functional groups wherein a refractive index is improved by means of an intramolecular sulfide bond, such as 2-mercapto-3-thiahexane-1,6-dithiol, 5,5-bis(mercaptomethyl)-3,7-dithianonane-1,9-dithiol, 2,4,5-tris(mercaptomethyl)-1,3-dithiorane, 5-(2-mercaptoethyl)-3,7-dithianonane-1,9-dithiol and the above compound represented by formula (1) or (2), more preferably the above compound represented by formula (1) or (2).

The polythiol compound represented by formula (1) can be readily prepared as described in Japanese Patent Application Laid-Open No. 270859/1990, i.e., a process comprising reaction of an epihalohydrin with 2-mercaptoethanol and then with thiourea.

The polythiol compound represented by formula (2) can be readily prepared as described in Japanese Patent Application Laid-Open No. 252207/1995 i.e., a process comprising reacting epichlorohydrin with 2-mercaptoethanol and reacting the resulting diol with sodium sulfide to give a tetraol compound, which then reacts with thiourea in hydrochloric acid and hydrolyzed by aqueous ammonia.

The polyisocyanate compound used in preparation of Component A can be selected, without limitations, from compounds having at least two intramolecular isocyanate groups which can react with a thiol group; for examples aliphatic and alicyclic polyisocyanates such as hexamethylenediisocyanate (HDI) xylylenediisocyanate (XDI), α,α,α', α'-tetramethylxylylenediisocyanate (TMXDI), isophoronediisocyanate (IPDI), hydrogenated XDI (H—XDI), hydrogenated MDI (H—MDI) and norbornenediisocyanate (NBDI); and aromatic polyisocyanates such as 4,4'-diphenylmethanediisocyanate (MDI), 1,5-naphthylenediisocyanate (NDI) and tolidinediisocyanate (TODI). The isocyanate may be one which has been subjected to a modification such as trimerization or polymerization in the light of improvement of physical properties of a final resin product.

Given weather resistances Abbe number and the like of a resin obtained, among these isocyanate compounds, aliphatic and alicyclic compounds are preferable and also in the light of a refractive index of the resin, XDI, NBDI, TMXDI, H—MDI and the like are most preferable.

Component A is a thiourethane prepolymer compound prepared by reacting the above polythiol compound with the above polyisocyanate compound in a molar ratio of —SH/—NCO ranging from 3.0 to 7.0, preferably 3.5 to 6.5, more preferably 4.0 to 6.0. If the molar ratio of —SH/—NCO is less than 3.0, a prepolymer obtained may be too viscous to be easily treated, and in an extreme case, cannot be blended with other monomer compounds or may embrace crystals. If the ratio of —SH/—NCO is higher than 7.0, a concentration of thiourethane bond in a prepolymer obtained may be too low to achieve an adequate effect of the prepolymer formation in a final cured product. A polythiol can reacted with a polyisocyanate compound according to, for example, a known urethane-formation reaction, which is preferably conducted under an inert gas atmosphere, at a temperature higher than 40° C., for an adequate period, in the presence of a catalyst such as tin compounds, e.g., dibutyltin dilaurate and dibutyltin dichloride, amines, e.g., N,N-dimethylcyclohexylamine, N,N-di-n-butylethanolamine and triethylamine, and the like.

Completion of a prepolymer formation reaction can be confirmed by, for example, sampling an aliquot of the reaction mixture and then performing FT-IR spectroscopy, integrating spectra obtained until an adequate sensitivity to observe deletion of an absorption characteristic of NCO group. An equivalent value of free SH group in the prepolymer obtained can be determined by dissolving a prepolymer precisely weighed into an appropriate solvent and then titrating it with a standard iodine solution. Its refractive index can be determined with, for example, a Abbe refractometer.

Component B is at least one (meth)acrylate compound having at least 2 functional groups to which the thiol group in Component A can be radically added or co-polymerized. Here, a radical addition means an addition reaction of a thiol with an unsaturated bond of a polyene or (meth)acrylate compound; and a radical co-polymerization means an addition reaction between unsaturated bonds.

Specifically Component B may include trimethylolpropane tri(meth)acrylate, tris[(meth)acryloxyethyl]-isocyanurate, pentaerythritol tetra(meth)acrylate, dipentaerythritol hexa(meth)acrylate, 1,1,3,3,5,5-hexa[(meth)acryloxy]cyclotriphosphazene, 1,1,3,3,5,5-hexa[(meth)acryloxyethylenedioxy]cyclotriphosphazene, neopentylglycol di(meth)acrylate, ethyleneglycol di(meth)acrylate, diethyleneglycol di(meth)acrylate, triethyleneglycol di(meth)acrylate, tetraethyleneglycol di(meth)acrylate, propyleneglycol di(meth)acrylate, 1,3-butanediol di(meth)acrylate, 1,4-butanediol di(meth)acrylate, 1,6-hexanediol di(meth)acrylate and the compounds represented by the following general formula (3).

Given an overall balance in physical properties, Component B preferably comprises the compound represented by the general formula (3):

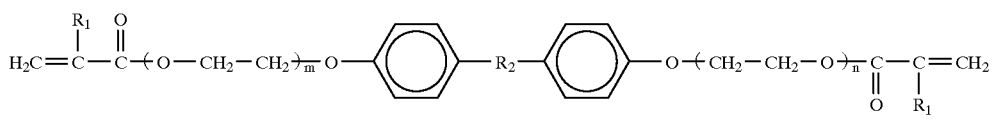

(3)

wherein $R_1$ represents hydrogen atom or methyl group; $R_2$ represents —$CH_2$—, —$C(CH_3)_2$— or —$SO_2$—; both m and n are an integer between 0 and 4; and m+n is 0 to 4.

Specifically, compounds represented by the general formula (3) may include 2,2-bis[4-(meth)acryloxyphenyl]-propane, 2,2-bis[4-(meth)acryloxyphenyl]methane, 2,2-bis[4-(meth)acryloxyphenyl]sulfone, 2,2-bis[4-(meth)-acryloxyethoxyphenyl]propane, 2,2-bis[4-(meth)acryloxyethoxyphenyl]methane, 2,2-bis[4-(meth)acryloxyethoxyphenyl]sulfone, 2,2-bis[4-(meth)acryloxydiethoxyphenyl]-propane, 2,2-bis[4-(meth)acryloxydiethoxyphenyl]methane and 2,2-bis[4-(meth)acryloxydiethoxyphenyl]sulfone.

Component C may be, without limitations, any compound polymerizable with Components A and B, but given viscosity of a monomer and a refractive index of a final resin, is preferably divinylbenzene, diisopropenylbenzene, styrenes a ring-substituted styrene, a monofunctional (meth)acrylate or the like. Specifically, o-divinylbenzene, m-divinylbenzene, p-divinylbenzene, m-diisopropenylbenzene, p-diisopropenylbenzene, styrene, methylstyrene, chlorostyrene, dichlorostyrenee bromostyrene, dibromostyrene, methyl (meth)acrylate, ethyl (meth)acrylate, propyl (meth)acrylate, isopropyl (meth) acrylate, cyclohexyl (meth)acrylate, benzyl (meth)acrylate, phenoxyethyl (meth)acrylate, glycidyl (meth)acrylate and glycidyl allyl ether, more preferably divinylbenzene.

Proportions of Components A, B and C cannot be generally defined because they may vary depending on their refractive index and viscosity, various physical properties of a resin obtained, and the like, but it is preferable that Components A, B and C are mixed in proportions of 10 to 50% by weight, 35 to 70% by weight, and 5 to 30% by weight, preferably 15 to 35% by weight, 45 to 65% by weight and 10 to 25% by weight, respectively.

An optical resin composition of this invention may contain, if necessary, various additives such as UV absorbents, antioxidants, anti-yellowing agents, bluing agents, pigments, dyes, functional coloring materials and mold releasing agents to achieve desired physical properties or functions, as long as it does not adversely affect the effects of this invention.

An optical resin with a high refractive index of this invention can be prepared by polymerizing and curing an optical resin composition of this invention, and has a refractive index (nd) of at least 1.58.

Curing can be performed by, for example, a casting polymerization utilizing a known radical polymerization. Specifically, to an optical resin composition of this invention is added a radical generator such as a radical-polymerization initiator, a photo-initiator or the like, and the mixture is well mixed, filtered, adequately defoamed under a reduced pressure and then poured into a mold to initiate a radical polymerization.

A mold may consist of, for example, two plates of mirror-abraded template via a gasket made of polyethylene, ethylene-vinyl acetate co-polymer, polyvinyl chloride, or the like.

The template may be a combination of glass-glass, glass-plastic plate, glass-metal plate or the like. A gasket can be selected from the above soft thermoplastic resins, or alternatively a template consisting of two plates can be fixed with a polyester adhesive tape or the like. Furthermore, a template may be conducted with a mold releasing treatment.

A radical generator in a thermal polymerization, that is, a radical-polymerization initiator, may be selected, without limitations, from known peroxides such as benzoyl peroxide, p-chlorobenzoyl peroxide, lauroyl peroxide, acetyl peroxide, di-t-butyl peroxide, 1,1di-t-butylperoxy-3, 3,5-trimethylcyclohexane, t-butylperoxy pivalate, t-butylperoxy 2-ethylhexanoate, t-butylperoxy benzoate, bis (4-t-butylcyclohexyl)peroxy dicarbonate, diisopropylperoxy dicarbonate and t-butylperoxy isopropyl carbonate; and azo compounds such as azobisisobutyro-nitrile. One or a mixture of two or more of these compounds are used in a proportion of 0.005 to 5 parts by weight, preferably 0.01 to 3 parts by weight, per 100 parts by weight of a mixture of Components A, B and C. A temperature and a period for curing via a thermal polymerization may be determined based on a radical-polymerization initiator used, a size of a cured product and the like.

A radical generator in a photopolymerization with UV rays, i.e., a photo-initiator, may be selected, without limitations, from known 4-phenoxydichloroacetophenone, 4-t-butyl-dichloroacetophenone, 4-t-butyl-trichloroacetophenone, 2,2-diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)phenyl-(2-hydroxy-2-propyl) ketone, 1-hydroxycyclohexylphenyl ketone, 2-methyl-1-[4-(methylthio)phenyl]-2-morpholino-1-propanone, benzoin, benzoin methyl ether, benzoin ethyl ether, benzoin isopropyl ether, benzoin isobutyl ether, benzyl dimethyl ketal, benzophenone, benzoylbenzoic acid, methyl benzoylbenzoate, methyl 4-dimethylaminobenzoate, isoamyl p-dimethylaminobenzoate, 4-phenylbenzophenone, hydroxybenzophenone, 4,4'-diethylaminobenzophenone, 4-benzoyl-4'-methyldiphenylsulfide, 3,3'-dimethyl-4-methoxybenzophenone, thioxanthone, 2-chlorothioxanthone, 2-methylthioxanthone, 2,4-dimethylthioxanthone, isopropylthioxanthone, 2,4-dichlorothioxanthone, 1-phenyl-1,2-propanedione-2-(o-ethoxycarbonyl)oxime, 2,4,6-trimethylbenzoyldiphenylphosphine oxide, methyl phenyl glyoxalate, benzyl, 9,10-phenanthrequinone, camphorquinone, dibenzosuberone, 2-ethylanthraquinone, 4',4''-diethyl-isophthalophenone and 3,3',4,4'-tetra(t-butylperoxy-carbonyl)benzophenone. One or a mixture of two or more of these compounds are used in a proportion of 0.005 to 5 parts by weight, preferably 0.01 to 3 parts by weight, per 100 parts by weight of a mixture of Components Ag B and C. Furthermore, the above initiator can be concomitantly used with the above radical-polymerization initiator.

In a polymerization with γ-ray, a radical-polymerization initiator is not needed.

At the end of curing, the mold is cooled and then released to remove a resin.

The removed resin may beg if necessary, annealed to remove internal stress.

An optical lens of this invention is prepared by polymerizing and curing an optical resin composition of this invention as described above, and has a refractive index (nd) of at least 1.58. The lens of this invention may be prepared by casting polymerization using a mold for a lens, or alternatively by abrading a mass of optical resin obtained by polymerization and curing.

For a casting polymerizations at the end of curing, the molding may be annealed, if necessary. An optical lens of this invention may be, if necessary, subjected to physical or chemical treatments such as surface abrasion, antistatic treatment, hard coating, non-reflection coating and dyeing treatment, for improvements such as prevention of reflection, improvement in hardness and cosmetic improvement.

This invention will be more specifically described by the following examples, and it is to be understood that this invention is not limited to them. The term "part(s)" in the following examples means part(s) by weight.

Physical properties of resins and lenses in the examples and the comparative examples were evaluated as described below.

(1) Transparency (Tr.): this was visually observed, and one without color, turbidity or strain was rated to "good".

(2) Refractive index (R.I.), Abbe number (A.N.): this was determined with a Pulfrich refractometer although a refractive index of a prepolymer was determined by a Abbe refractometer.

(3) Impact resistance (I.R.): a lens with a center thickness of 1.5 mm was subject to a dropping-ball test using a 67 g of steel ball (according to the FDA standards), and was rated to "O" if passed or "x" if not passed.

(4) Thermal resistance (T.R.): TMA was determined by a penetrating method, and a resin/lens with a deformation temperature of below 80° C. or higher than 80° C. was rated to "x" or "O", respectively.

(5) Tintability (T.A.): a resin/lens was dyed together with a diethyleneglycol bisallylcarbonate resin as a control in a dyeing bath, and was rated to "O" if dyed equal to or more than the control, or "x" if less than the control.

EXAMPLE 1

To 78.1 parts of the trithiol compound represented by the above formula (1) (0.300 mol) were added 21.9 parts of $\alpha,\alpha,\alpha',\alpha'$-tetramethylxylylenediisocyanate (0.090 mol) and mixed, to which with stirring, 0.1 parts of N,N-dimethylcyclohexylamine was added under nitrogen atmosphere at 40° C., and then the mixture was mixed.

The reaction mixture was heated to 60° C. and reacted at the temperature for 6 hours with stirring to provide a thiourethane prepolymer compound (TUPP-1) as a colorless, transparent and viscous liquid, whose IR spectrum showed absorption from isocyanate group, indicating completion of the reaction. About 5 g of the prepolymer was precisely weighed, dissolved into 50 ml of chloroform/methanol (1/1) solution and quantified for free mercapto group by titration with 1 N of standard iodine solution, to give a value of 7.2 meq (milli equivalent)/g.

A refractive index of this prepolymer compound was 1.63.

EXAMPLE 2

The procedure as described in Example 1 was conducted, except that 78.1 parts of the trithiol compound and 21.9 parts of $\alpha,\alpha,\alpha',\alpha'$-tetramethylxylylenediisocyanate were replaced with 80.7 parts of the tetrathiol compound represented by the above formula (2) (0.220 mol) and 19.3 parts of hydrogenated MDI (0.074 mol), respectively, to provide a thiourethane prepolymer compound (TUPP-2) as a colorless, transparent and viscous liquid. About 5 g of the prepolymer was precisely weighed, dissolved into 50 ml of chloroform/methanol (1/1) solution and quantified for free-mercapto group by titration with 1 N of standard iodine solution, to give a value of 7.3 meq/g. Its refractive index was 1.62.

EXAMPLE 3

Dibutyltin dichloride (0.1 parts) was added to 78.2 parts of the trithiol compound represented by the above formula (1) (0.30 mol) and dissolved. To the mixture, with stirring, 20.8 parts of xylylenediisocyanate (0.11 mol) was dropwise added under nitrogen atmosphere at 40° C. over 15 min., and at the end of adding the reaction mixture was heated to 60° C. and reacted at the temperature for 6 hours with stirring to provide a thiourethane prepolymer compound (TUPP-3) as a colorless, transparent and viscous liquid, whose IR spectrum showed no absorption from isocyanate groups indicating completion of the reaction. About 5 g of the prepolymer was precisely weighed, dissolved into 50 ml of chloroform/methanol (1/1) solution and quantified for free mercapto group by titration with 1 N of standard iodine solution, to give a value of 6.9 meq/g. Its refractive index was 1.64.

EXAMPLE 4

The procedure as described in Example 3 was conducted, except that 78.2 parts of the trithiol compound and 20.8 parts of xylylenediisocyanate were replaced with 76.5 parts of the tetrathiol compound represented by the above formula (2) (0.21 mol) and 23.5 parts of hydrogenated MDI (0.09 mol), respectively, to provide a thiourethane prepolymer compound (TUPP-4) as a colorless, transparent and viscous liquid. About 5 g of the prepolymer was precisely weighed, dissolved into 50 ml of chloroform/methanol (1/1) solution and quantified for free mercapto group by titration with 1 N of standard iodine solution, to give a value of 6.6 meq/g. Its refractive index was 1.62.

PREPARATION EXAMPLE 1

The procedure as described in Example 1 was conducted, except that 78.1 parts of the trithiol compound and 21.9 parts of $\alpha,\alpha,\alpha',\alpha'$-tetramethylxylylenediisocyanate were replaced with 88.6 parts of pentaerythritol tetrakismercaptopropionate (0.181 mol) and 11.4 parts of xylylenediisocyanate (0.061 mol), respectively, to provide a thiourethane prepolymer compound (TUPP-5) as a colorless, transparent and viscous liquid. About 5 g of the prepolymer was precisely weighed, dissolved into 50 ml of chloroform/methanol (1/1) solution and quantified for free mercapto group by titration with 1 N of standard iodine solution, to give a value of 6.0 meq/g. Its refractive index was 1.58.

PREPARATION EXAMPLE 2

The procedure as described in Example 3 was conducted, except that 78.2 parts of the trithiol compound was replaced with 86.7 parts of pentaerythritol tetrakis (mercaptopropionate) (0.18 mol) and the amount of xylylenediisocyanate was changed from 20.8 parts to 13.4 parts (0.07 mol), to provide a thiourethane prepolymer compound (TUPP-6) as a colorless, transparent and viscous liquid. About 5 g of the prepolymer was precisely weighed, dissolved into 50 ml of chloroform/methanol (1/1) solution and quantified for free mercapto group by titration with 1 N of standard iodine solution, to give a value of 5.8 meq/g. Its refractive index was 1.58.

EXAMPLE 5

First, 20.0 parts of the thiourethane prepolymer compound from Example 1 (TUPP-1), 45.0 parts of 2,2-bis(4-acryloxydiethoxyphenyl)methane, 15.0 parts of trimethylolpropane trimethacrylate and 20.0 parts of divinylbenzene were adequately mixed and then to the mixture were added 0.2 parts of bis(4-t-butylcyclohexyl)peroxy dicarbonate and 0.2 parts of t-butylperoxy-2-ethylhexanoate as radical-polymerization initiators. The mixture was mixed and defoamed to provide an optical resin composition. The composition was poured into a concave-lens mold with an outer diameter of 80 mm, a center thickness of 1.5 mm and a edge thickness of 10 mm consisting of glass templates and a gasket; and cured by raising its temperature from 50° C. to 130° C. over 3 hours, and then at 130° C. for 1 hour.

After cooling to room temperature, the lens was released from the glass template to provide a colorless and transparent concave lens. The measured physical properties of this lens are shown in Table 1.

EXAMPLE 6

First, 30.0 parts of the thiourethane prepolymer compound from Example 2 (TUPP-2), 20.0 parts of 2,2-bis(4-cryloxydiethoxyphenyl)propane, 30.0 parts of tris(acrylxyethyl) isocyanurate and 20.0 parts of divinylbenzene were adequately mixed and then to the mixture were added 0.2 parts of bis(4-t-butylcyclohexyl)peroxy dicarbonate and 0.2 parts of t-butylperoxy-2-ethylhexanoate as radical-polymerization initiators. The mixture was mixed and defoamed to provide an optical resin composition. The composition was cured as described in Example 5, to provide a colorless and transparent concave lens. The measured physical properties of this lens are shown in Table 1.

EXAMPLE 7

First, 20.0 parts of the thiourethane prepolymer compound from Example 1 (TUPP-1), 45.0 parts of 2,2-bis(4-acryloxydiethoxyphenyl)methane, 15.0 parts of triethyleneglycol diacrylate and 20.0 parts of divinylbenzene were adequately mixed and then to the mixture were added 0.2 parts of lauroyl peroxide and 0.2 parts of t-butylperoxy-2-ethylhexanoate as radical-polymerization initiators. The mixture was then mixed and defoamed to provide an optical resin composition.

The composition was cured as described in Example 5, to provide a colorless and transparent concave lens. The measured physical properties of this lens are shown in Table 1.

EXAMPLE 8

First, 32.0 parts of the thiourethane prepolymer compound from Example 3 (TUPP-3), 58.0 parts of tris(acryloyloxyethyl) isocyanurate and 10.0 parts of divinylbenzene were adequately mixed and then to the mixture was added 0.04 parts of 2-hydroxy-2-methyl-1-phenylpropan-1-one as a photo-initiator. The mixture was then mixed and defoamed to provide an optical resin composition.

The composition was poured into a concave-lens mold with an outer diameter of 80 mm, a center thickness of 1.5 mm and an edge thickness of 10 mm consisting of two glass templates and a polyester adhesive tape; and cured by radiating with light of a high-pressure mercury lamp (80 W/cm) from a distance of 15 cm for 5 minutes.

After cooling to room temperatures the adhesive tape was removed and a product was released from the glass template to provide a colorless and transparent concave lens. The measured physical properties of this lens are shown in Table 1.

EXAMPLE 9

First, 33.0 parts of the thiourethane prepolymer compound from Example 3 (TUPP-3), 57.0 parts of tris(acryloyloxyethyl) isocyanurate, 5.0 parts of ethyleneglycol dimethacrylate and 5.0 parts of divinylbenzene were adequately mixed and then to the mixture was added 0.04 parts of 2-hydroxy-2-methyl-1-phenylpropan-1-one as a photo-initiator. The mixture was then mixed and defoamed to provide an optical resin composition.

The composition was cured as described in Example 8 to provide a colorless and transparent concave lens. The measured physical properties of this lens are shown in Table 1.

EXAMPLE 10

First, 45.0 parts of the thiourethane prepolymer compound from Example 4 (TUPP-4), 35.0 parts of trimethylol propanetriacrylate and 20.0 parts of divinylbenzene were adequately mixed and then to the mixture was added 0.04 parts of 2-hydroxy-2-methyl-1-phenylpropan-1-one as a photo-initiator. The mixture was then mixed and defoamed to provide an optical resin composition.

The composition was cured as described in Example 8 to provide a colorless and transparent concave lens. The measured physical properties of this lens are shown in Table 1.

EXAMPLE 11

First, 20.0 parts-of the thiourethane prepolymer compound from Example 3 (TUPP-3), 45.0 parts of 2,2-bis(4-acryloxydiethoxyphenyl)methane, 15.0 parts of ethyleneglycol dimethacrylate and 20.0 parts of divinylbenzene were adequately mixed and then to the mixture was added 0.10 parts of 2-hydroxy-2-methyl-1-phenylpropan-1-one as a photo-initiator. The mixture was then mixed and defoamed to provide an optical resin composition.

The composition was cured as described in Example 8 to provide a colorless and transparent concave lens. The measured physical properties of this lens are shown in Table 1.

COMPARATIVE EXAMPLE 1

First, 30.0 parts of the thiourethane prepolymer compound from Preparation Example 1 (TUPP-5), 20.0 parts of 2,2-bis(4-acryloxydiethoxyphenyl)propane, 30.0 parts of tris(acryloxyethyl) isocyanurate and 20.0 parts of divinylbenzene were adequately mixed and then to the mixture were added 0.2 parts of bis(4-t-butylcyclohexyl)-peroxy dicarbonate and 0.2 parts of t-butylperoxy-2-ethylhexanoate as radical-polymerization initiators. The mixture was mixed and defoamed to provide an optical resin composition.

The composition was cured as described in Example 5, to provide a colorless and transparent concave lens. The measured physical properties of this lens are shown in Table 2.

COMPARATIVE EXAMPLE 2

The curing procedure as described in Example 5 was conducted, except that 20.0 parts of the thiourethane prepolymer compound from Example 1 (TUPP-1) was replaced with 20.0 parts of the trithiol compound represented by the above formula (1), to provide a colorless and transparent concave lens.

The measured physical properties of this lens are shown in Table 2.

COMPARATIVE EXAMPLE 3

First, 15.6 parts of the trithiol compound represented by the above formula (1) (0.06 mol) rather than 20.0 parts of the thiourethane prepolymer compound from Example 1 (TUPP-1), 4.4 parts of α,α,α',α'-tetramethylxylylenediisocyanate (0.018 mol), 45.0 parts of 2,2-bis(4-acryloxydiethoxyphenyl)methane, 15.0 parts of trimethylolpropane trimethacrylate and 20.0 parts of divinylbenzene were adequately mixed and then to the mixture were added 0.2 parts of bis(4-t-butylcyclohexyl)-peroxy dicarbonate and 0.2 parts of t-butylperoxy-2-ethylhexanoate as radical-polymerization initiators; 0.03 parts of dibutyltin dichloride as a catalyst for an urethane-forming reaction; and 0.1 parts of acidic dioctyl phosphate as an internal mold releasing agent. The mixture was then mixed and defoamed.

The resulting composition was cured as described in Example 5, to provide a colorless and transparent concave lens. The measured physical properties of this lens are shown in Table 2.

COMPARATIVE EXAMPLE 4

First, 45.0 parts of the thiourethane prepolymer compound from Preparation Example 2 (TUPP-6), 35.0 parts of trimethylol propanetrimethacrylate and 20.0 parts of divinylbenzene were adequately mixed and then to the mixture were added 0.04 parts of 2-hydroxy-2-methyl-1-phenylpropan-1-one as a photo-initiator. The mixture was then mixed and defoamed to provide an optical resin composition.

The composition was cured as described in Example 8, to provide a colorless and transparent concave lens. The measured physical properties of this lens are shown in Table 2.

COMPARATIVE EXAMPLE 5

The curing procedure as described in Example 8 was conducted, except that 32.0 parts of the thiourethane prepolymer compound from Example 3 (TUPP-3) was replaced with 32.0 parts of the trithiol compound represented by the above formula (1), to provide a colorless and transparent concave lens.

The measured physical properties of this lens are shown in Table 2.

COMPARATIVE EXAMPLE 6

First, 30.0 parts of the thiourethane prepolymer compound from Example 3 (TUPP-3) and 70.0 parts of 2,2-bis[4-(methacryloyloxydiethoxy)phenyl]propane were adequately mixed and then to the mixture were added 0.04 parts of 2-hydroxy-2-methyl-1-phenylpropan-1-one as a photo-initiator The mixture was then mixed and defoamed.

The composition was cured as described in Example 8, the adhesive tape was removed and the mold was cooled with water, but a resin formed was not released due to its rubbery property.

COMPARATIVE EXAMPLE 7

First, 26.1 parts of the trithiol compound represented by the above formula (1), 6.9 parts of xylylenediisocyanate, 57.0 parts of tris(acryloyloxyethyl) isocyanurate, 5.0 parts of ethyleneglycol dimethacrylate and 5.0 parts of divinylbenzene were adequately mixed and then to the mixture were added 0.04 parts of 2-hydroxy-2-methyl-1-phenylpropan-1-one as a photo-initiator; 0.03 parts of dibutyltin dichloride as a catalyst for an urethane-forming reaction; and 0.1 parts of acidic dioctyl phosphate as an internal mold releasing agent. The mixture was then mixed and defoamed.

The resulting composition was cured as described in Example 8, then the adhesive tape was removed, and a lens formed was released by wedging. The surface of the lens was still soft.

The measured physical properties of this lens are shown in Table 2.

TABLE 1

|  | Tr. | R.I. | A.N. | I.R. | T.R. | T.A. |
| --- | --- | --- | --- | --- | --- | --- |
| Example 5 | Good | 1.590 | 35.3 | o | o | o |
| Example 6 | Good | 1.598 | 36.1 | o | o | o |
| Example 7 | Good | 1.588 | 35.3 | o | o | o |
| Example 8 | Good | 1.592 | 38.5 | o | o | o |
| Example 9 | Good | 1.587 | 40.5 | o | o | o |
| Example 10 | Good | 1.601 | 38.1 | o | o | o |
| Example 11 | Good | 1.590 | 35.8 | o | o | o |

TABLE 2

|  | Tr. | R.I. | A.N. | I.R. | T.R. | T.A. |
| --- | --- | --- | --- | --- | --- | --- |
| Com. Ex. 1 | Good | 1.573 | 37.0 | o | o | o |
| Com. Ex. 2 | Good | 1.593 | 36.5 | o | x | o |
| Com. Ex. 3 | Striae | 1.591 | 35.4 | o | x | o |
| Com. Ex. 4 | Good | 1.563 | 41.7 | o | o | o |
| Com. Ex. 5 | Good | 1.594 | 40.5 | o | x | o |
| Com. Ex. 7 | Good | 1.585 | 40.8 | x | x | o |

Description of Table 1 and 2

The resin of Comparative Example 1 prepared by thermal polymerization using the prepolymer made from the thiocarboxylate type of thiol has an unsatisfactory refractive index lower than that of a resin of this invention. The resin-of Comparative Example 2 prepared by thermal polymerization using the trithiol compound without prepolymerization has an insufficient thermal resistance. The resin of Comparative Example 3 prepared by thermal polymerization of simultaneous reaction of the isocyanate, thiol and polyene compounds shows striae and has an insufficient thermal resistance.

The resins of Comparative Examples 4 to 7 gave similar results. Specifically, the resin of Comparative Example 4 has an unsatisfactorily low refractive index; the resin of Comparative Example 5 has an insufficient thermal resistance; and the resin of Comparative Example 7 was not fully cured and has insufficient impact and thermal resistance.

What is claimed is:

1. An optical resin compositions comprising:
    Component A: a thiourethane prepolymer compound prepared by reacting a polythiol compound having at least 3 mercapto groups and an intramolecular sulfide bond, with a polyisocyanate compound in a molar ratio of —SH to —NCO ranging from 30 to 7.0;
    Component B: at least one (meth)acrylate compound having at least 2 (meth)acrylate groups; and
    Component C: a compound radically polymerizable with Components A and B;
in 10 to 50% by weight, 35 to 70% by weight, and 5 to 30% by weight, respectively.

2. An optical resin composition according to claim 1, wherein the polythiol compound contained in Component A is represented by the following formula (1) or (2):

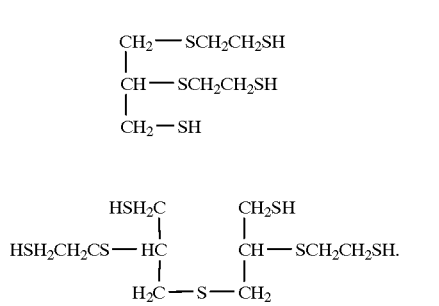
(1)

(2)

3. An optical resin composition according to claim 1, wherein Component B comprises a compound represented by the following general formula (3):

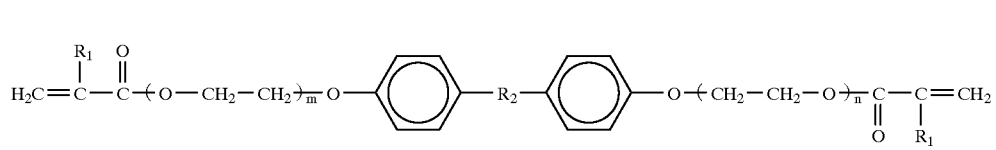
(3)

wherein $R_1$ represents hydrogen atom or methyl group; $R_2$ represents $-CH_2-$, $-C(CH_3)_2-$ or $-SO_2-$; both m and n are an integer between 0 and 4; and m+n is 0 to 4.

4. An optical resin composition according to claim 1, wherein Component C is selected from the group consisting of divinylbenzene, diisopropenylbenzene, styrene, ring-substituted styrenes and monofunctional (meth)acrylate compounds.

5. An optical resin with a high refractive index prepared by polymerizing and curing a composition according to claim 1 a whose refractive index (nd) is at least 1.58.

6. An optical resin with a high refractive index prepared by polymerizing and curing a composition according to claim 2, whose refractive index (nd) is at least 1.58.

7. An optical resin with a high refractive index prepared by polymerizing and curing a composition according to claim 3, whose refractive index (nd) is at least 1.58.

8. An optical resin with a high refractive index prepared by polymerizing and curing a composition according to claim 4, whose refractive index (nd) is at least 1.58.

9. A preparation process of an optical resin with a high refractive index whose refractive index (nd) is at least 1.58, comprising polymerizing and curing a composition according to claim 1 by photopolymerization with ultraviolet rays.

10. A preparation process of an optical resin with a high refractive index whose refractive index (nd) is at least 1.58, comprising polymerizing and curing a composition according to claim 2 by photopolymerization with ultraviolet rays.

11. A preparation process of an optical resin with a high refractive index whose refractive index (nd) is at least 1.58, comprising polymerizing and curing a composition according to claim 3 by photopolymerization with ultraviolet rays.

12. A preparation process of an optical resin with a high refractive index whose refractive index (nd) is at least 1.58, comprising polymerizing and curing a composition according to claim 4 by photopolymerization with ultraviolet rays.

13. A thiourethane prepolymer compound prepared by reacting a polythiol compound having at least 3 mercapto groups and an intramolecular sulfide bond with a polyisocyanate compound in a molar ratio of —SH/—NCO ranging from 3.0 to 7.0.

14. A thiourethane prepolymer compound according to claim 13, wherein the polythiol compound is represented by the following formula (1) or (2):

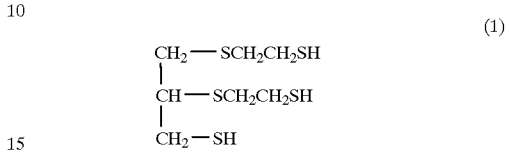
(1)

-continued

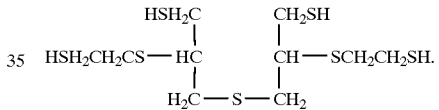
(2)

15. A thiourethane prepolymer compound according to claim 13, wherein the polyisocyanate compound is at least one compound selected from the group consisting of α,α,α',α'-tetramethylxylylenediisocyanate, xylylenediisocyanate, hydrogenated MDI and norbornendiisocyanate.

* * * * *

UNITED STATES PATENT AND TRADEMARK OFFICE
CERTIFICATE OF CORRECTION

PATENT NO. : 5,908,876
DATED : June 1, 1999
INVENTOR(S) : Kenichi FUJII et al

It is certified that error appears in the above-identified patent and that said Letters Patent is hereby corrected as shown below:

On the title page: Item [30]

column 1, in accordance with the Claim for Convention Priority filed on January 10, 1999, please add the following Foreign Application Priority Data:

-- April 19, 1996   [JP]   Japan ............. 8-097919

August 20, 1996 [JP]   Japan ............. 8-218502 --

In column 15, claim 5, line 3, after "claim 1", delete "a".

Signed and Sealed this

Twenty-third Day of May, 2000

Attest:

Q. TODD DICKINSON

*Attesting Officer*          *Director of Patents and Trademarks*